July 21, 1925.
C. C. FARMER
TRIPLE VALVE DEVICE
Filed Oct. 17, 1924
1,546,482
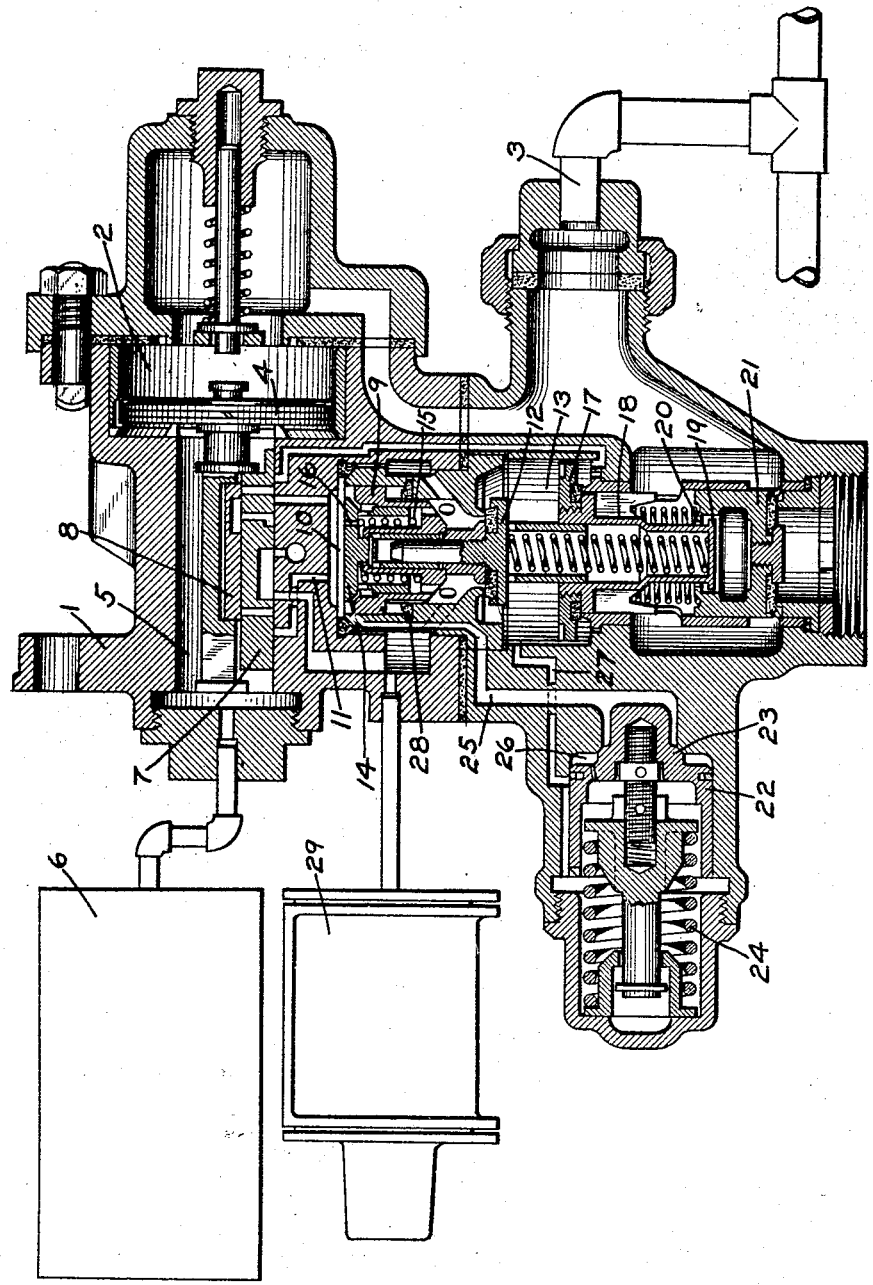
INVENTOR
CLYDE C. FARMER
BY *Wm. M. Cady*
ATTORNEY Patented July 21, 1925.

1,546,482

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE-VALVE DEVICE.

Application filed October 17, 1924. Serial No. 744,177.

*To all whom it may concern:*

Be it known that I, CLYDE C. FARMER, a citizen of the United States, residing at Pittsburgh, in the county of Allegheny and State of Pennsylvania, have invented new and useful Improvements in Triple-Valve Devices, of which the following is a specification.

This invention relates to fluid pressure brakes, and more particularly to means for controlling the flow of fluid to the brake cylinder in an emergency application of the brakes.

When an emergency application of the brakes is made on a long train, the brakes may be applied with force on the cars at the head end of the train, while the brakes on the cars at the rear end of the train are only lightly applied and this may cause the slack to run in and thereby produce shocks.

It has heretofore been proposed to provide means for delaying the build up of brake cylinder pressure in an emergency application of the brakes, so as to secure a more nearly simultaneous application of the brakes throughout the train. While delaying the build up of brake cylinder pressure in an emergency application is desirable on long slow speed freight trains, it is not necessary on short high speed trains.

The principal object of my invention is to provide improved means for retarding the build up of brake cylinder pressure in an emergency application of the brakes and for automatically cutting out the retarded emergency action under certain conditions of high speed short train service.

In the accompanying drawing, the single figure is a sectional view of a triple valve device embodying my invention.

The triple valve device shown in the drawing comprises a casing 1 having a piston chamber 2 connected to the brake pipe 3 and containing piston 4 and having a valve chamber 5 connected to the auxiliary reservoir 6 and containing a main slide valve 7 and a graduating slide valve 8 adapted to be operated by piston 4.

Contained in the triple valve casing is an emergency valve mechanism comprising an emergency piston 9, the chamber 10 at one side of which is provided with a port 11 leading to the seat of slide valve 7.

Operable by piston 9 is an emergency valve 12 contained in valve chamber 13, and mounted in said piston is a check valve 14, biased to open position by a spring 15 and having a restricted port 16 extending through the check valve.

Also mounted in valve chamber 13 is a valve piston 17 having a downwardly extending stem 18 provided with a flange 19 at its lower end, which is adapted to engage a flange 20 of a vent valve 21, when the valve piston 17 has moved upwardly a slight distance.

The construction as so far described is similar to that disclosed in my prior application, Serial No. 587,901, filed September 13, 1922. According to my present invention, an additional valve mechanism is provided for cutting out the retarded emergency feature of the triple valve device under certain conditions, comprising a piston 22 carrying a valve 23 and subject to the pressure of a coil spring 24. The valve 23 controls communication from a passage 25, leading to piston chamber 10 to piston chamber 26 of the piston 22 and piston 22 controls communication from piston chamber 26 to a passage 27, leading to valve chamber 13.

In operation, upon a sudden reduction in brake pipe pressure, the triple valve piston 4 is moved to emergency position and the main slide valve 7 is shifted, so that passage 11 is uncovered, permitting fluid from valve chamber 5 and the auxiliary reservoir 6 to flow to piston chamber 10. The emergency piston 9 is thereby shifted to its seat 28 and the check valve 14 is seated in said piston.

The movement of piston 9 opens the emergency valve 12, so that fluid in valve chamber 13 is vented to the brake cylinder 29. Brake pipe pressure acting on the under side of piston 17 then operates to unseat the piston, permitting fluid from the brake pipe to be vented to the brake cylinder. When the piston 17 has moved sufficiently to take up the lost motion between the flanges 19 and 20, the valve 21 will be unseated, so as to vent fluid from the brake pipe to the atmosphere.

When the brake pipe pressure has been reduced to a point slightly less than the pressure in chamber 13 and the brake cylinder, the piston 17 will again seat, so as to cut off the further flow of fluid from the brake pipe to the brake cylinder. The downward movement of piston 17 also permits the valve 21 to seat, so that further venting of fluid from the brake pipe to the atmosphere is prevented.

While the above action is taking place, fluid under pressure is slowly being supplied from the auxiliary reservoir through the restricted port 16 in check valve 14 to the brake cylinder and when the brake cylinder pressure has been increased by flow through the port 16 to a point at which the brake cylinder pressure plus the pressure of spring 15, slightly exceeds the reduced auxiliary reservoir pressure acting in chamber 10, the check valve 14 will be unseated, permitting the rapid equalization of auxiliary reservoir pressure into the brake cylinder.

According to the present invention, the seated area of valve 23 is subject to the pressure of fluid supplied to piston chamber 10 from the auxiliary reservoir in an emergency application. The spring 24 is of such force that the valve 23 will be held seated when the auxiliary reservoir pressure acting on the seated area is less than a predetermined amount, such as 110 pounds. If the auxiliary reservoir pressure exceeds 110 pounds, as would be the case when the pressure carried in the brake system is at a higher point, then in an emergency application of the brakes, the valve 23 will be unseated when fluid from the auxiliary reservoir is supplied to piston chamber 10 in an emergency application of the brakes and the full area of piston 22 being then exposed to auxiliary reservoir pressure, the piston 22 will be quickly shifted outwardly, so as to open communication from passage 27 to piston chamber 26. Fluid under pressure can then flow from the auxiliary reservoir through passage 25 to piston chamber 26 and thence through passage 27 to valve chamber 13.

From valve chamber 13, fluid then flows past the open valve 12 to the brake cylinder 29, so that when the pressure carried in the brake system and in the auxiliary reservoir exceeds a predetermined degree the flow of fluid to the brake cylinder is rapid and is not limited or retarded by flow through the restricted port 16 in check valve 14.

It is customary to employ a brake pipe pressure of 110 pounds or less on long trains operating in low speed freight train service and a higher brake pipe pressure on short trains operating in high speed train service, so that with my present invention, the retarded emergency feature is in effect on long slow speed freight trains where a brake pipe pressure of 110 pounds or less is carried, while on short high speed trains, where a higher brake pipe pressure is carried, the retarded emergency feature is cut out, and a quick build up of brake cylinder pressure in emergency is automatically produced.

Having now described my invention, what I claim as new and desire to secure by Letters Patent, is:—

1. In a fluid pressure brake, the combination with a brake pipe, brake cylinder, auxiliary reservoir, and a valve device operated upon a sudden reduction in brake pipe pressure for supplying fluid from the auxiliary reservoir to the brake cylinder, of means for limiting the rate of flow of fluid from the auxiliary reservoir to the brake cylinder and means operating when the auxiliary reservoir pressure exceeds a predetermined degree for effecting a more rapid flow of fluid from the auxiliary reservoir to the brake cylinder.

2. In a fluid pressure brake, the combination with a brake pipe, brake cylinder, auxiliary reservoir, and a valve device operated upon a sudden reduction in brake pipe pressure for supplying fluid from the auxiliary reservoir to the brake cylinder at a restricted rate, of means operating when the auxiliary reservoir pressure exceeds a predetermined degree for supplying fluid from the auxiliary reservoir to the brake cylinder at a rapid rate.

3. In a fluid pressure brake, the combination with a brake pipe, brake cylinder, auxiliary reservoir, and a valve device operated upon a sudden reduction in brake pipe pressure for supplying fluid from the auxiliary reservoir to the brake cylinder, of means having a restricted port through which fluid is supplied from the auxiliary reservoir to the brake cylinder in an emergency application of the brakes, and means subject to the unrestricted flow of fluid from the auxiliary reservoir and operated at a predetermined pressure in the auxiliary reservoir for opening a large communication from the auxiliary reservoir to the brake cylinder.

In testimony whereof I have hereunto set my hand.

CLYDE C. FARMER.